(No Model.)
H. S. CUSHMAN.
HARNESS TERRET.
No. 420,042. Patented Jan. 28, 1890.
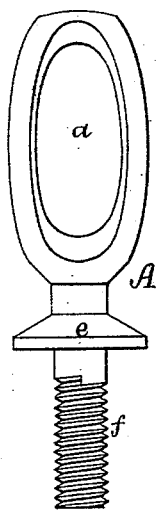
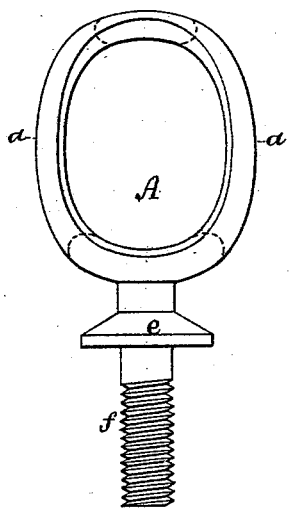
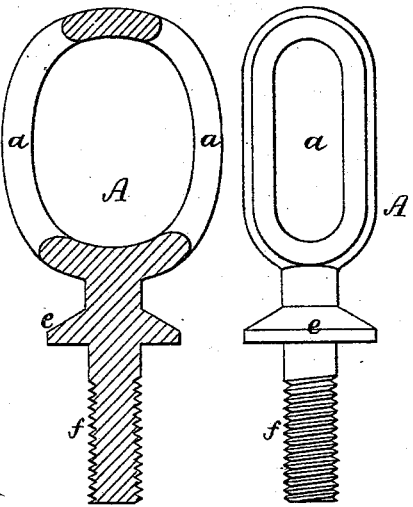
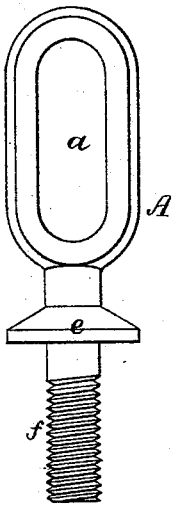
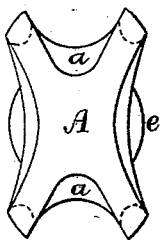
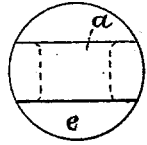
Witnesses
A. F. Piper
W. E. Piper
Inventor.
Henry S. Cushman.
by S. N. Piper, atty.

UNITED STATES PATENT OFFICE.

HENRY S. CUSHMAN, OF MILFORD, MASSACHUSETTS.

HARNESS-TERRET.

SPECIFICATION forming part of Letters Patent No. 420,042, dated January 28, 1890.

Application filed October 23, 1889. Serial No. 327,880. (No model.)

*To all whom it may concern:*

Be it known that I, HENRY S. CUSHMAN, a citizen of the United States, residing at Milford, in the county of Worcester and State of Massachusetts, have invented certain new and useful Improvements in Harness-Terrets; and I do declare the following to be a full, clear, and exact description of the invention, such as will enable others skilled in the art to which it appertains to make and use the same, reference being had to the accompanying drawings, and to the letters of reference marked thereon, which form a part of this specification.

Figure 1 is a front view, Fig. 2 a side view, Fig. 3 a top view, and Fig. 4 a longitudinal section, of a harness-terret made in accordance with my improvement. Fig. 5 represents a top view, and Fig. 6 a front view, of a modification of my invention.

The object of my improvement is to overcome the tendency of the driving-lines of a harness to twist while in use, as they are liable to do when the terrets have the usual circular opening for the said lines.

In carrying out my improvement I usually provide each of the terrets A of a saddle with two oblong openings or passages $a\ a$ for the reins, said openings approximating an ellipse in form, as shown in front view in Fig. 1, although said terret may be provided with a single opening, as shown in Figs. 5 and 6. I prefer, however, the construction first shown, as it gives a longer and more substantial bearing than the latter for the lines, the upper portion of the said terret being represented as composed of two rings joined to each other at their junction with the shank at $b$ and also at top, as shown at $c$, and are arranged between said junctions apart from each other, so that the two slots $a\ a$ formed thereby are elliptical or oblong openings of suitable width to receive and guide the reins and prevent them from turning therein for the purpose explained.

The driving-lines are usually made flat in shape in transverse section, and by forming the openings in the terrets for the said lines, as represented, they are prevented from turning in said openings, and will be retained in the position in which they are placed when applied to the terrets.

The terret is provided with the shoulder $e$ to rest on the upper surface of the saddle, and also with the shank $f$, screw-threaded as usual, for receiving a nut to secure the terret to the saddle.

Having described my improvement what I claim is—

The harness-terret composed of two rings connected to each other at their junction with the shank and at the top, as shown, leaving between them slots $a\ a$ for the purpose set forth, the rim or border of each slot being unbroken, substantially as shown, and for the purpose described.

In testimony whereof I affix my signature in presence of two witnesses.

HENRY S. CUSHMAN.

Witnesses:
JOHN M. WOOD,
GEO. P. COOKE.